(12) United States Patent
Zinssler

(10) Patent No.: US 9,938,730 B2
(45) Date of Patent: Apr. 10, 2018

(54) SEALING ELEMENT

(71) Applicant: KNAUF GIPS KG, Iphofen (DE)

(72) Inventor: Sven Zinssler, Kitzingen (DE)

(73) Assignee: Knauf Gips KG, Iphofen (DE)

( * ) Notice: Subject to any disclaimer, the term of this patent is extended or adjusted under 35 U.S.C. 154(b) by 0 days.

(21) Appl. No.: 15/103,954

(22) PCT Filed: Jan. 13, 2014

(86) PCT No.: PCT/EP2014/000052
§ 371 (c)(1),
(2) Date: Jun. 13, 2016

(87) PCT Pub. No.: WO2015/104032
PCT Pub. Date: Jul. 16, 2015

(65) Prior Publication Data
US 2016/0312480 A1     Oct. 27, 2016

(51) Int. Cl.
*E04F 13/02*     (2006.01)
*E04F 21/165*     (2006.01)
*E04F 13/04*     (2006.01)
*F16L 5/10*     (2006.01)

(52) U.S. Cl.
CPC ........ *E04F 21/1657* (2013.01); *E04F 13/042* (2013.01); *E04F 21/1655* (2013.01); *F16L 5/10* (2013.01)

(58) Field of Classification Search
CPC .. F16J 15/02; F16J 15/022; F16J 15/04; E04F 13/06; E04F 13/068; E04F 21/0038
See application file for complete search history.

(56) References Cited

U.S. PATENT DOCUMENTS

| | | | | |
|---|---|---|---|---|
| 4,195,877 A | * | 4/1980 | Duda | B60P 3/343 135/120.1 |
| 5,974,753 A | * | 11/1999 | Hsu | E04F 13/0862 52/287.1 |
| 6,722,092 B2 | * | 4/2004 | Kunz | E04F 13/06 52/255 |

(Continued)

FOREIGN PATENT DOCUMENTS

| | | |
|---|---|---|
| DE | 9407166 U1 | 8/1994 |
| DE | 19611468 A1 | 9/1997 |

(Continued)

OTHER PUBLICATIONS

Communication pursuant to Art. 94(3) EPC dated Jun. 7, 2017, in European patent application No. 14704071, which is a counterpart to U.S. Appl. No. 15/103,954.

*Primary Examiner* — Gilbert Lee
(74) *Attorney, Agent, or Firm* — Robert Lelkes

(57) ABSTRACT

Sealing element for a waterproof sealing of junctions at structural elements of a building, the sealing element comprising a sealing tape (1) having a waterproof surface and a fabric layer (2) to which a sealing compound can adhere and which is fixed to the sealing tape (1) in a manner so that a portion of the fabric layer (2) projects outwardly from an outer edge (11) of the sealing tape (1), wherein the fabric layer (2) comprises a tear line portion (22; 221, 222) to allow for separating the outwardly projecting portion of the fabric layer (21) by tearing away the outwardly projecting portion of the fabric layer (21).

11 Claims, 3 Drawing Sheets

(56) References Cited

U.S. PATENT DOCUMENTS

| | | | | |
|---|---|---|---|---|
| 7,677,002 | B2* | 3/2010 | Bennett | B32B 21/06 52/177 |
| 2004/0163340 | A1* | 8/2004 | Harel | B32B 15/08 52/287.1 |
| 2005/0166372 | A1* | 8/2005 | Shepard | A44B 18/0049 24/442 |
| 2006/0059809 | A1* | 3/2006 | Smythe | E04F 13/06 52/255 |
| 2006/0070324 | A1* | 4/2006 | Daly | E04F 13/06 52/287.1 |
| 2006/0101746 | A1* | 5/2006 | Smythe | B32B 29/00 52/287.1 |
| 2011/0023392 | A1 | 2/2011 | Rosenthal et al. | |
| 2013/0186024 | A1* | 7/2013 | Rosentiel | E04F 13/06 52/255 |

FOREIGN PATENT DOCUMENTS

| | | | |
|---|---|---|---|
| WO | 0188304 | A1 | 11/2001 |
| WO | 2006032437 | A1 | 3/2006 |

* cited by examiner

SEALING ELEMENT

This invention relates to the field of sealings for buildings. Such a sealing prevents the passage of moisture in the form of water or water vapor through joints between bordering structural elements.

It is well-known to carry out such a sealing during the installation of plasterboards (i.e. wall boards, gypsum plasterboards, etc.), wherein the sealing is used at the joints where mounted plasterboards are connected. Such joints occur at wall-/wall-junctions or wall-/ceiling-junctions. Also, a sealing is used at the joints where a mounted plasterboard boarders another structural element (e.g. at wall-/floor-junctions).

A typical field of application is the interior of a bathroom which is normally exposed to a considerable amount of moisture. The plasterboards, especially gypsum plasterboards, need to be covered from the water vapor which penetrates through joints between adjacent mounted plasterboards as well as through joints between the plasterboard and adjacent structural components.

The sealing is carried out by use of a sealing element comprising a sealing tape and a fabric material. The sealing tape is a band formed of an elastic material having a waterproof surface. The fabric material, i.e. woven or non-woven textile or tissue, is fixed to the sealing tape to allow for incorporating the sealing element in a sealing compound which adheres to the fabric material. The sealing element can be variously embodied, in particular as sealing strip, as sealing sleeve or as sealing corner. A sealing strip is typically used in sealings of flat joints formed by bordering mounted plasterboards. An application for the sealing sleeve would be sealing a penetrating tube which protrudes through a wall made from plasterboards. The sealing corner can be used to seal a junction between the plasterboard and a floor as structural element.

The processing of such a sealing element in form of a sealing strip is carried out by applying a first layer of sealing compound (e.g. joint filler) over the joint to be sealed. Place the sealing strip in the still wet first layer of sealing compound and let cure the first layer of sealing compound. Apply a second layer of sealing compound to incorporate the sealing strip which is fixed in the set first layer of sealing compound. Additional layers of the sealing compound or layers of other materials can be applied thereto to achieve specific quality characteristics.

The sealing sleeve is principally processed as described before for the sealing strip. Additionally, an opening in the sealing sleeve is provided and used to insert a pipe (or similar) while the sealing sleeve is placed in the still wet first layer of sealing compound. Similarly, the sealing corner is processed, but in difference to the above described, different sealing compounds are needed in case of the bordering structural elements are of a different material, like screed, concrete or brick wall.

The sealing compound can be chosen from a wide variety of compounds which are different in the material as well as in the physical properties. Widely known in the market as sealing compound is the product "Knauf Flächendicht", a polymer dispersion based on synthetic latex and inert fillers. After drying, this sealing compound is a waterproof expendable layer. Because of the low viscosity (i.e. 15000 mPas at 23° C.) it causes no problems to incorporate the fabric material therein, like wrinkles or folds. Thus, the fabric layer of the sealing element can be incorporated in the sealing compound flatly and smoothly.

Other sealing compounds have a significantly higher viscosity. One example of a highly viscous sealing compound is commercially known as "Knauf Power Elast", a sealing adhesive based on silan polyether, filler material and auxiliary material of high viscosity (i.e. 48000 mPas at 23° C.). The processing thereof is problematic because the fabric layer is too soft and the tackiness of the sealing compound causes the fabric layer to adhere to itself, to trough folds and to wrinkle. Hence, the dimensional stability of the fabric layer is too low to be processed by use of such a high viscous sealing compound.

For processing high viscous sealing compounds, sealing elements are known without a fabric layer, which extends outwardly of the sealing tape. Since there is no projecting fabric layer, the processing with higher viscosity sealant compounds cannot cause any problems with wrinkling and cracking fabric layer material.

In view of the above-mentioned problems, it is an object of the present invention to provide a sealing element for different purposes. It is an object of the invention to provide a sealing element, which can be used with different compounds such as a high viscosity compound as well as a low viscosity compound. A further object of the invention is to provide a sealing element, which can be adapted to the type of sealing compound just before processing thereof.

In accordance with the invention, these objects are achieved by a sealing element as it is characterized by the features of the independent claim. Advantageous aspects of the sealing element according to the invention are the subject of the dependent claims.

In particular the invention relates to a sealing element for a waterproof sealing of junction at structural elements of a building. The sealing element comprises a sealing tape comprising a waterproof surface and a fabric layer to which a sealing compound can adhere and which is fixed to the sealing tape in a manner so that a portion of the fabric layer projects outwardly from an outer edge of the sealing tape. The fabric layer comprises a tear line portion to allow for separating the outwardly projecting portion of the fabric layer by tearing off the portion of the fabric layer projecting outwardly from the outer edge of the sealing tape from the fabric layer.

Advantageously, the sealing element comprises the tear line portion to allow for forming a sealing element without any material of the fabric layer which projects outwardly from the outer edge of the sealing tape. The sealing element without such an outwardly projecting fabric layer can be processed with a sealing compound of a high viscosity without occurring wrinkles etc.

According to one aspect, the tear line portion comprises a perforation (a multiplicity of single perforations). A perforation according to the present invention is a plurality of small holes which are arranged along the tear line portion. Perforating involves puncturing the fabric layer with a tool. The perforation allows for separating the fabric material along the tear line portion by tear the outwardly projecting fabric layer away without the need for a tool.

According to another aspect the perforation is arranged at the portion of the fabric layer so as to extend along the outer edge of the sealing tape so that after separation of the separable portion of the fabric layer, the outer edge of the sealing tape forms the outer contour of the sealing element. Hence, the entire fabric layer is of a fabric material which is fixed to the sealing tape so as to have a dimensional stability which is increased due to the attachment to the sealing tape of a comparably high dimensional stability.

According to still another aspect the fabric layer comprises a first perforation and a second perforation. The first perforation is arranged at a first outwardly projecting portion of the fabric layer so as to extend along a first outer edge of the sealing tape and the second perforation is arranged at a second outwardly projecting portion of the fabric layer so as to extend along a second outer edge of the sealing tape. The first outer edge and the second outer edge of the sealing tape are arranged with respect to each other at opposite sides at the sealing tape. This allows for forming a sealing strip adapted according to the invention so as to allow for tearing of the fabric layer material in a manner so that no further material projects outwardly from the sealing tape in case of the sealing element is processed with the sealing compound of high viscosity.

According to one aspect the sealing tape comprises at least one opening of a size and shape to allow for inserting a pipe element so that the pipe element is fixed therein. The sealing tape is made of an elastic material so as to allow for inserting the pipe while the at least one opening is extended. This results in a clamped fix of the pipe in the opening.

According to another aspect the fabric layer comprises at least one recess respectively arranged at each at least one opening of sealing tape so as to surround the opening of sealing tape. The fabric layer is of less elastic material compared to the material of the sealing tape. The recess allows for stretching the opening in an extended manner compared to when the fabric layer is fixed to the elastic material to directly border the at least one opening.

According to a further aspect the fabric layer comprises a longitudinally extending cut-out portion extending longitudinally along the entire sealing tape. The cut-out portion prevents the sealing compound to adhere to the sealing element since the sealing compound can only adhere to the fabric layer and not to the sealing tape.

According to another aspect the sealing tape comprises a preformed bending edge portion extending longitudinally along the entire sealing tape. The preformed bending edge portion allows for arranging the sealing element during processing along edges of buildings and the sealing element must not be pressed into the wet sealing compound in a manner so as to be fitted around an edge.

Additionally the sealing tape comprises a second preformed bending edge portion extending square to the first preformed bending edge portion. The first and second bending edge portions allow for forming a sealing edge applied in the corner of a building.

According to another aspect the sealing tape has a plurality of edge openings arranged along the outer edge of the sealing tape. The edge openings allow a firm fit of the sealing element in the sealing compound because of the sealing compound can protrude through these openings.

According to further aspects the sealing tape is of an elastic rubber material and the fabric material comprises polyester fabric material.

Further advantageous aspects of the sealing element according to the invention become apparent from the following description of embodiments of the invention with reference to the accompanying drawings in which.

Figure 1:
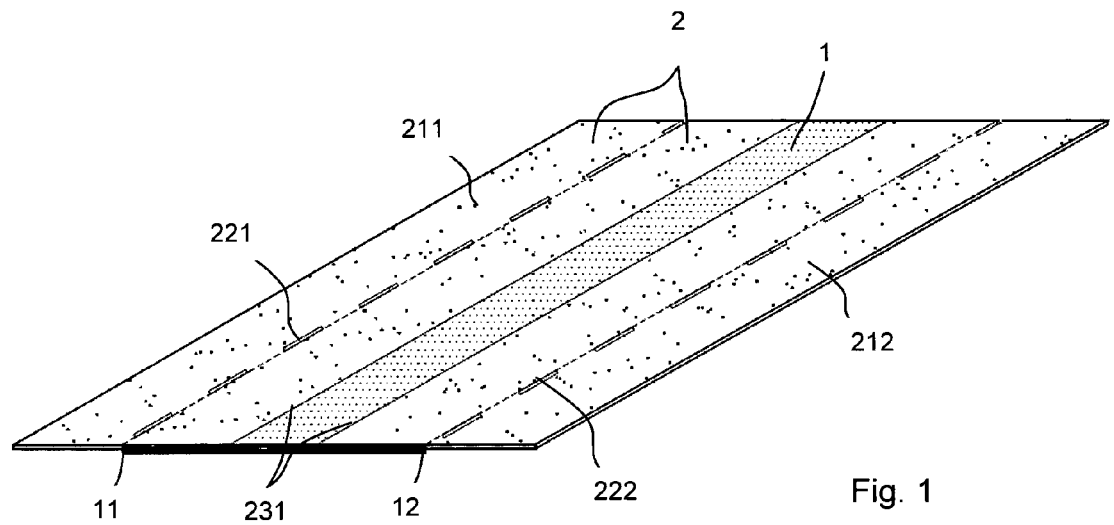
FIG. 1 shows a sealing strip.
Figure 2:
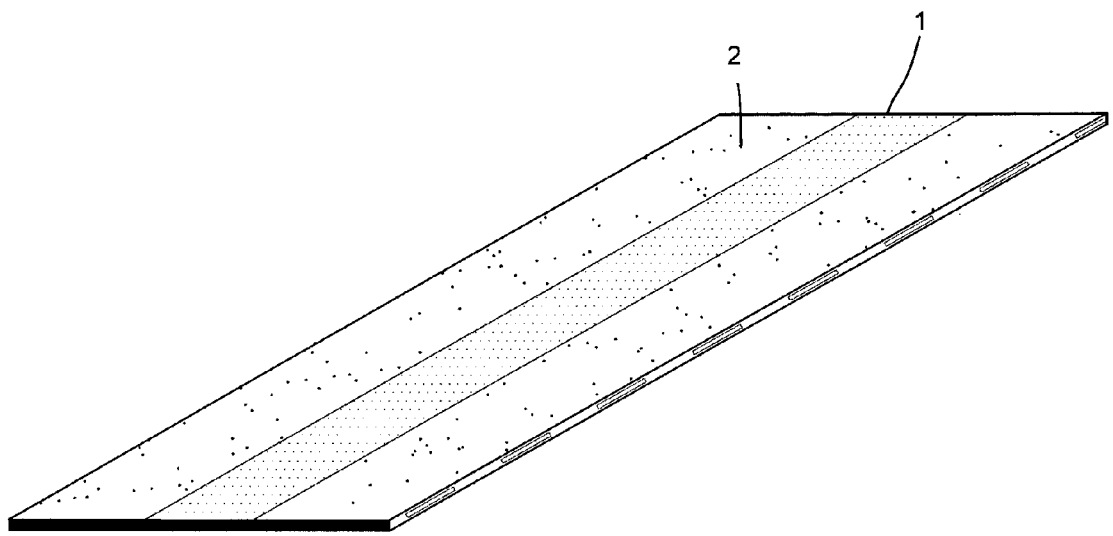
FIG. 2 shows the sealing strip of FIG. 1 with torn off outwardly protruding portions of the fabric layer.

In FIG. 1, the sealing element according to the invention is shown as a sealing strip from the top perspective. The shown sealing element can be used for a waterproof sealing of junctions at structural elements of a building. The sealing element has a sealing tape 1 and a fabric layer 2. Sealing tape 1 has a waterproof surface. Fabric layer 2 is of a material which allows for a sealing compound to adhere thereto and is fixed to sealing tape 1 in a manner so that a portion of fabric layer 2 projects outwardly from an (over an) outer edge 11, 22 of sealing tape 1. The fabric layer 2 comprises a first perforation 221 and a second perforation 222 as tear line portions. The first perforation 221 is arranged at a first outwardly projecting portion of the fabric layer 211 so as to extend along a first outer edge 11 of the sealing tape 1. The second perforation 222 is arranged at a second outwardly projecting portion of the fabric layer 212 so as to extend along a second outer 12 edge of the sealing tape 1. This allows forming a sealing element by tearing of the first and second outwardly projecting portions of the fabric layer 211, 212 and thus having no material of fabric layer 2 projecting outwardly from the outer edge of sealing tape 1, as shown in FIG. 2. The sealing element without such an outwardly projecting fabric layer can be processed with a sealing compound of a high viscosity without occurring problems like wrinkles etc.

Figure 3:
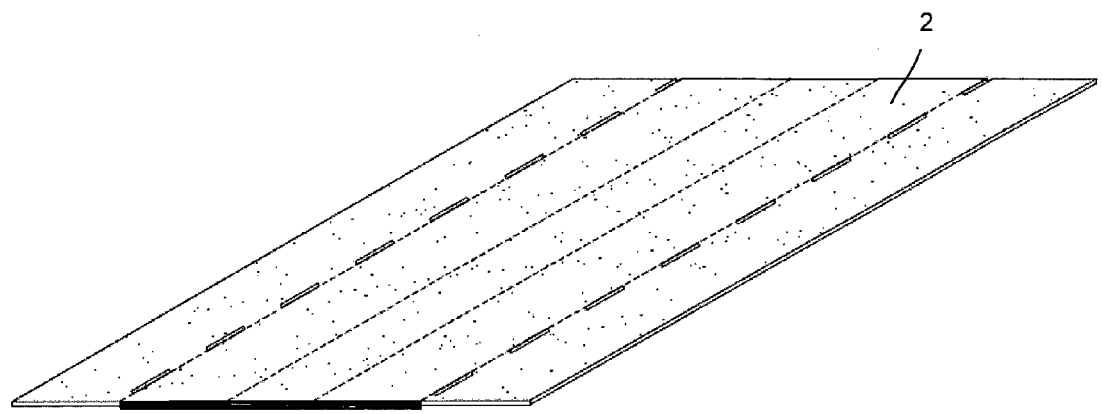
FIG. 3 shows the backside of the sealing strip of FIG. 1.

In FIG. 3, the backside of the sealing strip of FIG. 1 is shown. The sealing tape (not shown) is fully covered by the fabric layer 2.

Figure 4:
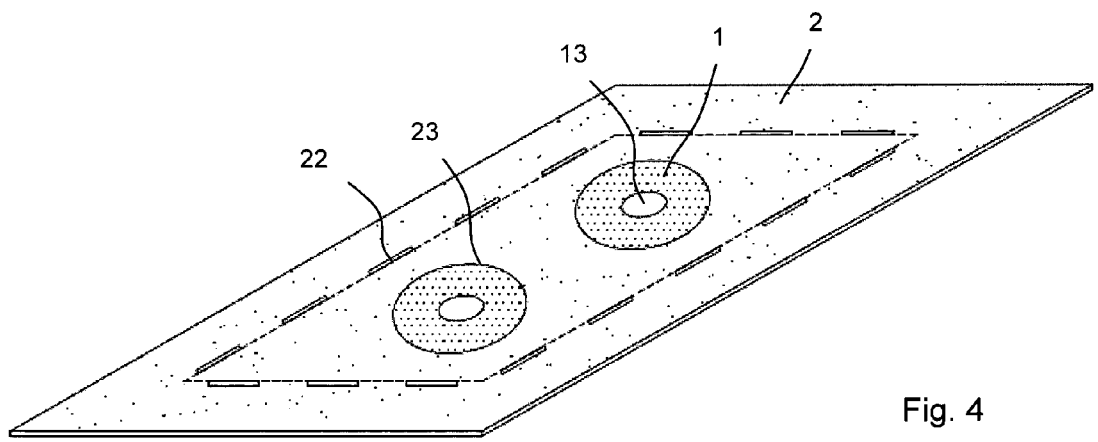
FIG. 4 shows a sealing sleeve.

According to FIG. 4, the sealing element is formed as sealing sleeve. The sealing sleeve, as well, comprises a sealing tape 1—can only be seen in the recess 13 of the fabric material 2—made of an elastic rubber material and a fabric layer 2 having a single circular extending perforation 22. Sealing tape 1 comprises two openings 13 through each of which a pipe can protrude for being sealed by the sleeve. Fabric layer 2 has two recesses 23 surrounding the two openings 13. The perforation allows for separating the outer portion of the fabric layer 2 to which a sealing compound (not shown) can adhere.

Figure 5:
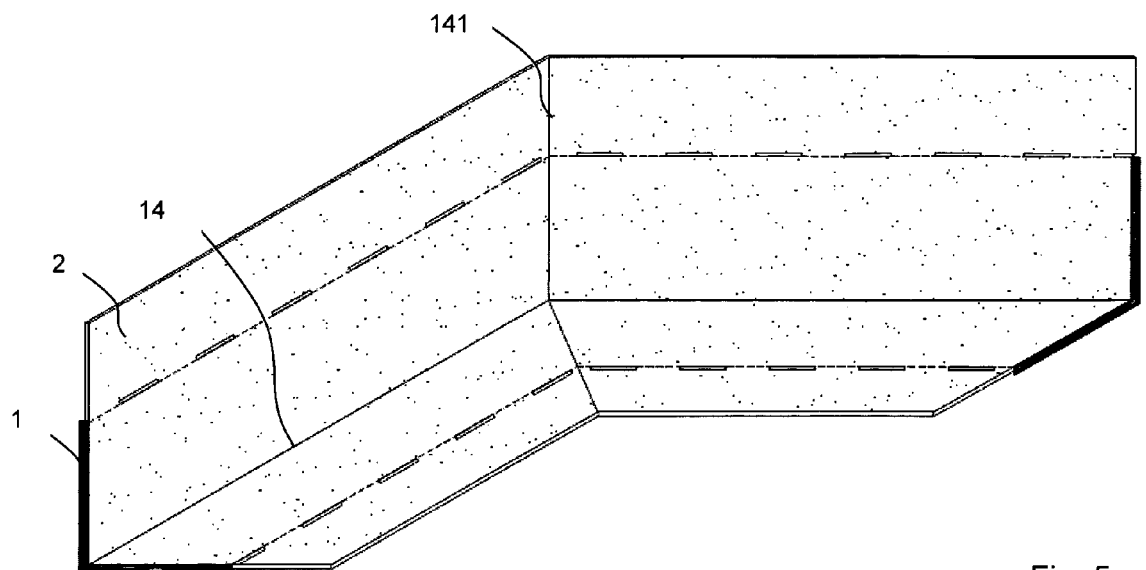
FIG. 5 shows a sealing corner.

According to FIG. 5, the sealing element is formed as sealing corner. The sealing corner has a sealing tape 1 which comprises a first preformed bending edge portion 14 and a second preformed bending edge portion 141 extending longitudinally along the entire sealing tape 1. The first and second bending edge portions are squarely arranged so as to fit into the corner of a room.

Figure 6:
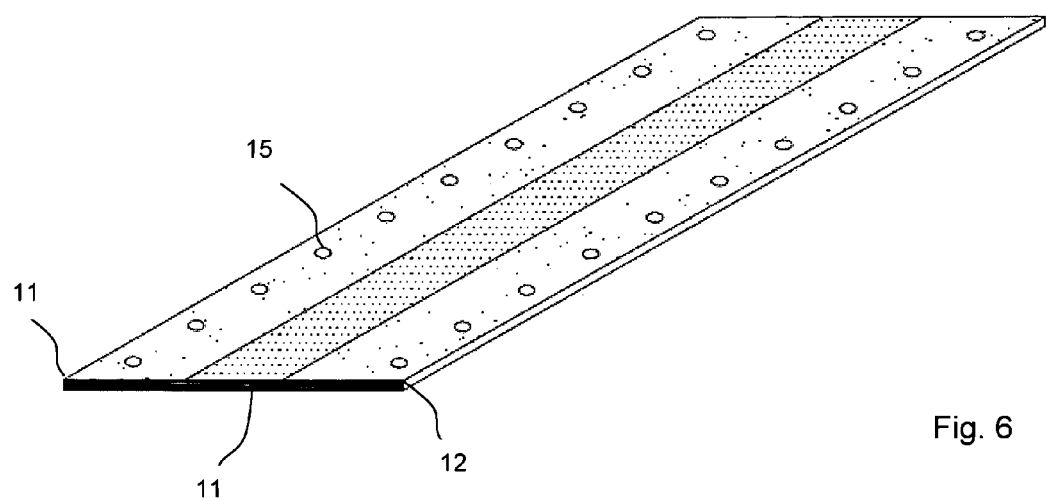
FIG. 6 shows a sealing strip of FIG. 1 having a plurality of edge openings.

In FIG. 6, the sealing element is a sealing strip having a plurality of edge openings 15 arranged along the outer edge 11, 12 of the sealing tape 1.

The invention claimed is:

1. A sealing element for a waterproof sealing of junctions at structural elements of a building, the sealing element comprising a sealing tape (1) having a waterproof surface and a fabric layer (2) to which a sealing compound can adhere and which is fixed to the sealing tape (1) in a manner so that a portion of the fabric layer (2) projects outwardly from an outer edge (11, 12) of the sealing tape (1), wherein the fabric layer (2) comprises a tear line portion (22; 221, 222) comprising a multiplicity of single perforations arranged along the tear line portion (22; 221, 222) to allow for separating the entire outwardly projecting portion of the fabric layer (21; 211, 212) along the tear line portion (22; 221, 222) by tearing away the outwardly projecting portion of the fabric layer (21; 211, 212) so that a sealing element without any fabric layer portion (21; 211, 212) projecting outwardly from the outer edge (11, 12) of the sealing tape (1) is formed.

2. The sealing element according to claim 1, wherein the perforation (22; 221, 222) is arranged at the portion of the fabric layer (2) so as to extend along the outer edge (11) of the sealing tape (1) so that after separation of the outwardly projecting portion of the fabric layer (21), the outer edge (11; 11, 12) of the sealing tape (1) forms at least a section of an outer contour of the sealing element.

3. The sealing element according to claim 1, wherein the fabric layer (2) comprises a first perforation (221) and a second perforation (222), the first perforation (221) is arranged at a first outwardly projecting portion of the fabric layer (211) so as to extend along a first outer edge (111) of the sealing tape (1) and the second perforation (222) is arranged at a second outwardly projecting portion of the fabric layer (222) so as to extend along a second outer (12) edge of the sealing tape (1), wherein the first outer edge (11) and the second outer edge (12) of the sealing tape (1) are arranged with respect to each other at opposite sides at the sealing tape (1).

4. The sealing element according to claim 1, wherein the sealing tape (1) comprises at least one opening (13) of a size and shape to allow for inserting a pipe element so that the pipe element is fixed therein.

5. The sealing element according to claim 4, wherein the fabric layer (2) comprises at least one recess (23) respectively arranged at each at least one opening (13) of sealing tape (1) so as to surround the opening (13) of sealing tape (1).

6. The sealing element according to claim 1, wherein the fabric layer (2) comprises a longitudinal cut-out portion (231) extending along the entire sealing tape (1).

7. The sealing element according to claim 1, wherein the sealing tape (2) comprises a first preformed bending edge portion (14) extending longitudinally along the entire sealing tape (1).

8. The sealing element according to claim 7, wherein the sealing tape (2) comprises a second preformed bending edge portion (141) extending square to the first preformed bending edge portion (14).

9. The sealing element according to claim 1, wherein the sealing tape (1) has a plurality of edge openings (15) arranged along the outer edge (11, 12) of the sealing tape (1).

10. The sealing element according to claim 1, wherein the sealing tape (1) comprises an elastic rubber material.

11. The sealing element according to claim 1, wherein fabric layer (2) comprises polyester fabric material.

* * * * *